(12) United States Patent
Dobos et al.

(10) Patent No.: US 12,096,749 B2
(45) Date of Patent: Sep. 24, 2024

(54) VIRTUAL REALITY SIMULATOR AND METHOD FOR SMALL LABORATORY ANIMALS

(71) Applicant: FEMTONICS KFT., Budapest (HU)

(72) Inventors: Gergely Dobos, Budapest (HU); Domonkos Péter Pinke, Székesfehérvár (HU); Tamás Tompa, Budapest (HU); Pál Maák, Budapest (HU); Máté Marosi, Budapest (HU); Gergely Katona, Budapest (HU); Gergely Szalay, Budapest (HU); Balázs Rózsa, Budapest (HU)

(73) Assignee: FEMTONICS KFT., Budapest (HU)

( * ) Notice: Subject to any disclaimer, the term of this patent is extended or adjusted under 35 U.S.C. 154(b) by 239 days.

(21) Appl. No.: 17/626,700

(22) PCT Filed: Jul. 9, 2020

(86) PCT No.: PCT/HU2020/050029
§ 371 (c)(1),
(2) Date: Jan. 12, 2022

(87) PCT Pub. No.: WO2021/009526
PCT Pub. Date: Jan. 21, 2021

(65) Prior Publication Data
US 2022/0295743 A1 Sep. 22, 2022

(30) Foreign Application Priority Data
Jul. 12, 2019 (HU) .................................... P1900252
Nov. 27, 2019 (HU) .................................... P1900400

(51) Int. Cl.
*A01K 15/02* (2006.01)
*G02B 27/00* (2006.01)
(Continued)

(52) U.S. Cl.
CPC .......... *A01K 15/02* (2013.01); *G02B 27/0093* (2013.01); *G06F 1/163* (2013.01); *G06F 3/013* (2013.01)

(58) Field of Classification Search
CPC ........ H04N 5/225; H04N 5/232; G02B 27/01; G02B 27/0093; A01K 15/02; G06F 1/163; G06F 3/013
See application file for complete search history.

(56) References Cited

U.S. PATENT DOCUMENTS 10,739,600 B1 * 8/2020 Yee ..................... G02B 27/0176
2017/0173326 A1 * 6/2017 Bloch ................ A61N 1/36139
(Continued)

OTHER PUBLICATIONS

Meyer et al; A Head-Mounted Camera System Integrates Detailed Behavioral Monitoring with Multichannel Electrophysiology in Free Moving Mice; Neuron 100, 46-60 (Year: 2018).*

*Primary Examiner* — Michael A Faragalla
(74) *Attorney, Agent, or Firm* — Olson & Cepuritis, Ltd.

(57) ABSTRACT

The present invention relates to a virtual reality simulator (10) for small laboratory animals (100), in particular rodents, which comprises a head clamping mechanism (20) for securing the laboratory animal (100) and virtual reality glasses (40) with two wings (30), each of the wings (30) having a display (34) and a lens system (36) spaced therefrom and connected together by a light barrier cover (32), and the virtual reality glasses (40) are configured to allow the two wings (30) to align with each of the eyes (101) of the laboratory animal (100), respectively. The invention further relates to a method applying such a simulator (10).

18 Claims, 3 Drawing Sheets

Figure 1A:
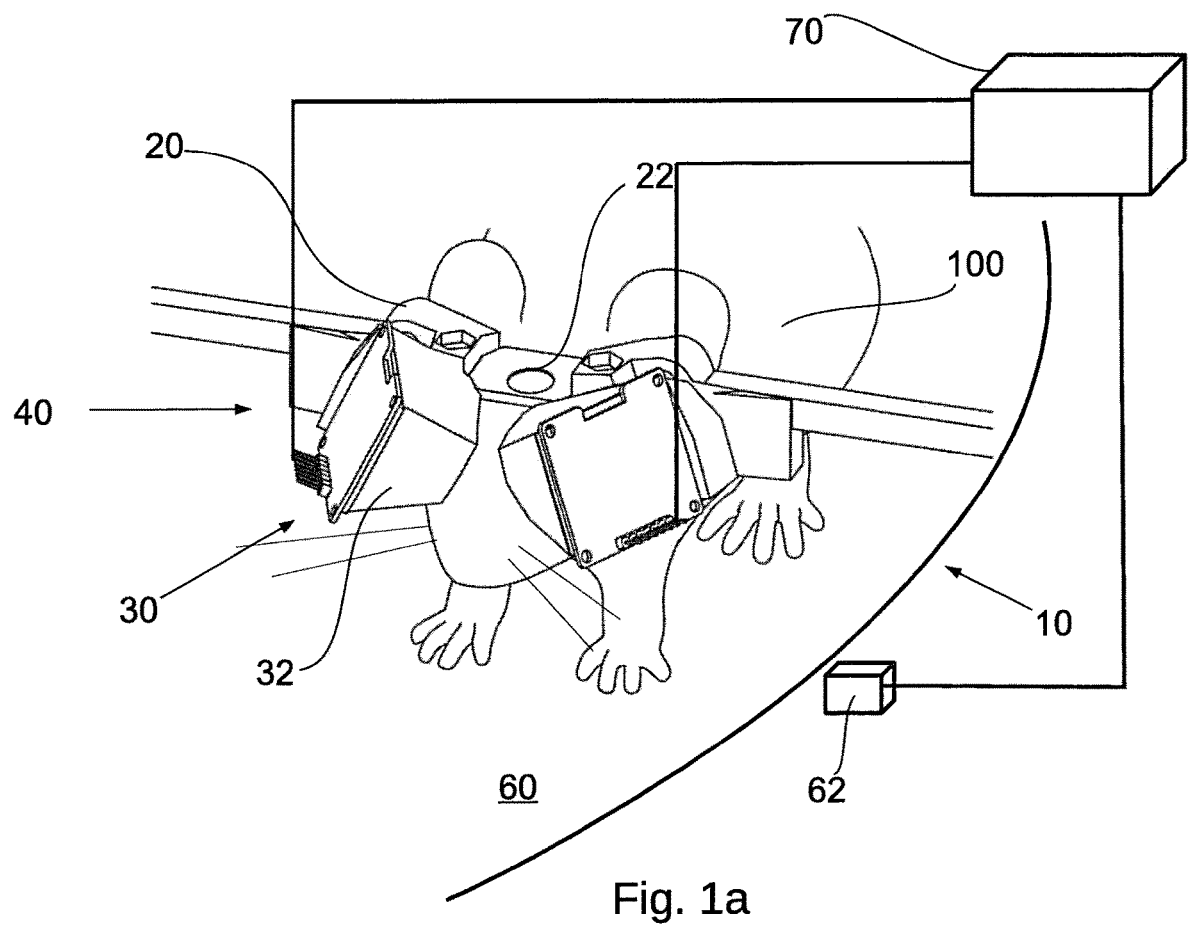

(51) Int. Cl.
    *G06F 1/16*     (2006.01)
    *G06F 3/01*     (2006.01)

(56) References Cited

U.S. PATENT DOCUMENTS

| | | | |
|---|---|---|---|
| 2018/0125360 A1* | 5/2018 | Högele | A61B 90/20 |
| 2019/0041634 A1* | 2/2019 | Popovich | G02B 6/00 |
| 2019/0068850 A1* | 2/2019 | Peper, Jr. | H04N 23/54 |

* cited by examiner

VIRTUAL REALITY SIMULATOR AND METHOD FOR SMALL LABORATORY ANIMALS

CROSS-REFERENCE TO RELATED APPLICATION

This application is a U.S. National Stage of PCT/HU2020/050029, filed Jul. 9, 2020, which claims priority to Hungarian Application No. P1900252, filed Jul. 12, 2019, and Hungarian Application No. P1900400, filed Nov. 27, 2019, each of which is incorporated herein by reference.

The present invention relates to a virtual reality simulator for small laboratory animals, in particular rodents.

The invention further relates to a method for simulating virtual reality for small laboratory animals.

Brain electrophysiological (EEG, electrode) and low-resolution microscopic measurements used in neurobiological research can be easily performed on freely moving experimental animals (e.g., mice, rats). In contrast, high-resolution in vivo brain imaging, such as two-photon microscopy occurs through a so-called craniotomy window in a head-fixed state. However, this makes it more difficult to perform experiments where we want to study the interaction of the animal with its environment and the resulting brain activity.

The solution to the above problem is the creation of a virtual environment (VR), which provides an opportunity to perform controlled animal experiments with a fixed head. There are currently several solutions for implementing a virtual environment. A common feature of these is that the virtual image content is displayed on the walls of the room surrounding the animal, such as using a projector or screen. Holscher et al. (Rats are able to navigate in virtual reality. J Exp Biol (2005); 208(3): 561-569) were the first to create the design that is still the basis for most virtual environment system designed for rodent. The main elements of this are a properly designed visual stimulus display and a treadmill. In this solution, the animal is surrounded by a torus-shaped dome 140 cm in diameter and 80 cm high, on the inner surface of which the virtual image content is projected by means of a projector. The animal stands inside the torus, on a sphere 50 cm in diameter, the movement of which—through a sensor that detects the movement of the driven surface—changes the projected virtual environment around the animal. The advantage of this solution is that the projected image almost completely fills the animal's field of vision. Further, known developments focus on the key elements of this basic design. For example, a solution called "JetBall-Dome" by a company called Phenosys uses a spherical dome instead of a torus and "floats" the spherical treadmill without friction by flowing compressed air.

Although many of the behavioral parameters of the animal interacting with its environment (e.g., running speed, eye movement, feeding, etc.) can be measured during in vivo brain imaging through the virtual environment systems described above, none of the known solutions provide adequate feedback on the animal's behavior and sensory stimulus. This is because these embodiments still do not fully create an immersive virtual environment (i.e., the level of perception of the virtual environment as if the animal were indeed present in the VR environment) due to a lack of depth, and due to the filling the binocular field with a continuous surface (only one, 2-dimensional image is displayed). We recognized that for 2-dimensional visual content, even if it substantially fills the animal's field of view, the laboratory animal finds enough visual reference points from its real environment. Because the animal's head is fixed, its vestibular system does not sense movement, and this is confirmed by these visual "grips" in its field of view. As a result, the animal does not believe it is moving, which can negatively affect the experiment. A further disadvantage of the known solutions is that they are not compatible with or ergonomically usable with multi-photon (e.g. two-photon) microscopes due to the large projection surfaces required to cover the field of view, as the dome can impede the free movement of the microscope objective.

Due to the above disadvantages, the current solutions are only suitable to a limited extent for the creation of virtual environments for experiments or for their combined use with two-photon microscopes.

It is an object of the present invention to provide a virtual reality simulator and method for small laboratory animals which is free from the disadvantages of the prior art solutions, i.e. which provides an immersive virtual environment for the fixed laboratory animal and which is compatible with two-photon microscopes.

It was recognized that the main consideration in behavioral, visual, and learning experiments is immersion, which can be achieved by depth perception as well as complete coverage of the field of view.

The invention is based on the recognition that with the help of a virtual reality simulator comprising compact virtual reality glasses with a large field of view and binocular depth sensing developed for laboratory animals, the laboratory animal (e.g. a mouse) can solve real behavioral tasks during electrophysiological- or brain imaging. Thanks to the invention, the immersion is formed practically immediately, and the experimental animal can realistically experience the virtual environment in a head-fixed state. This effect was experimentally demonstrated in five animals, during which we were able to stop the animal at the edge of a virtual abyss with high accuracy without teaching or accustoming to the system. When the virtual sidewalk was extended, the animals continued to run. This proves that they stopped because of 3-dimensional spatial perception, not just because of the contrast difference. With a conventional monitoring system, the same animal was unable to locate the abyss due to a lack of immersion.

It was also recognized that by using the simulator and method of the present invention, the time required to learn in visual learning experiments can be reduced surprisingly, by orders of magnitude compared to prior art systems (from 1-2 weeks to a few days). It is also suitable for examining the learning process, as we have already detected a significant learning process within a 40-minute period. The simulator and method according to the invention are also suitable for carrying out the behavioral experiments described in the literature.

In accordance with the above recognition the task was solved with the simulator according to claim 1 and with the method according to claim 14.

The preferred embodiments of the invention are determined in the dependent claims.

Figure 1B:
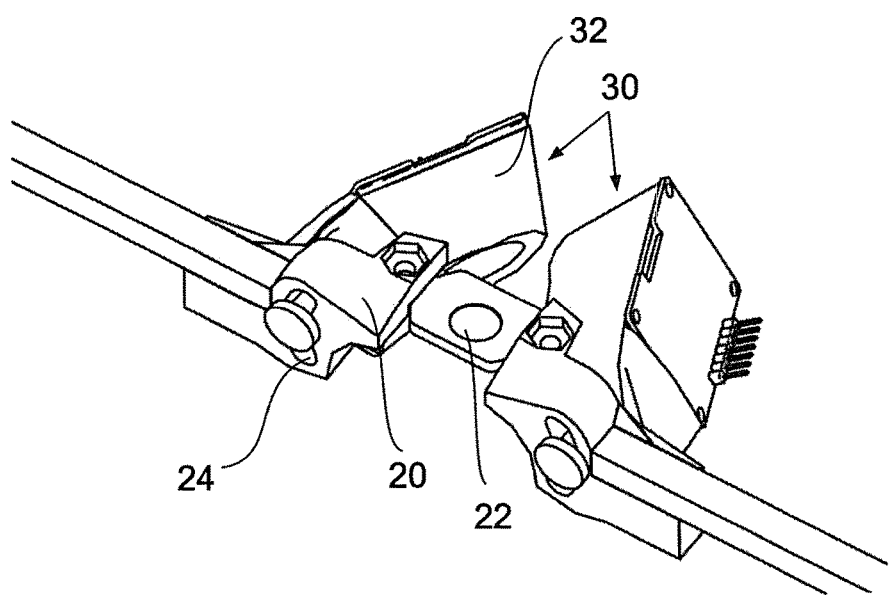

Further details of the invention will be explained by way of exemplary embodiments with reference to figures, wherein:

FIG. 1*a* is a schematic front perspective view of an exemplary embodiment of a simulator according to the invention in the condition applied to the laboratory animal, FIG. 1*b* is a schematic rear perspective view of the main parts of the simulator shown in FIG. 1*a,*

Figure 2:
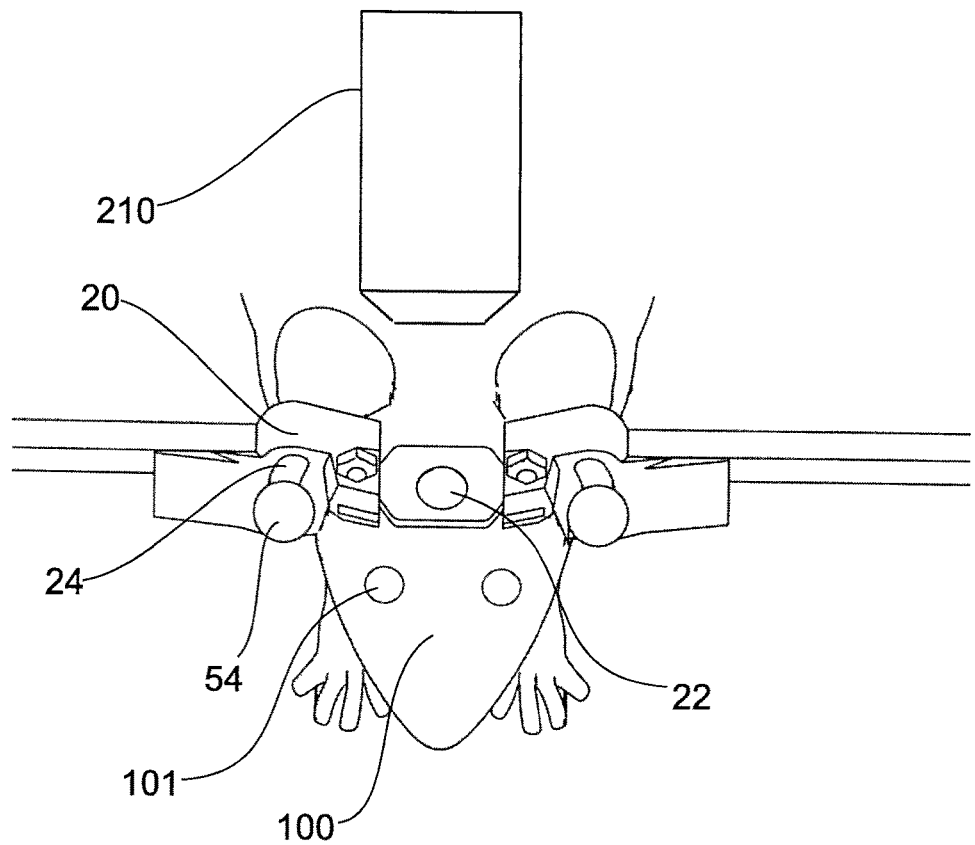
Figure 3:
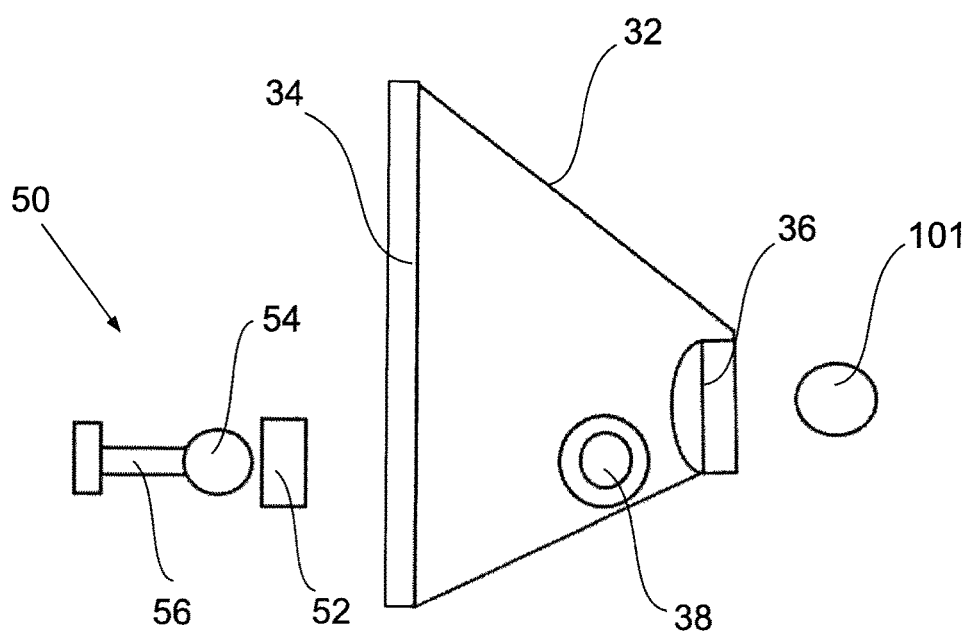
Figure 4:
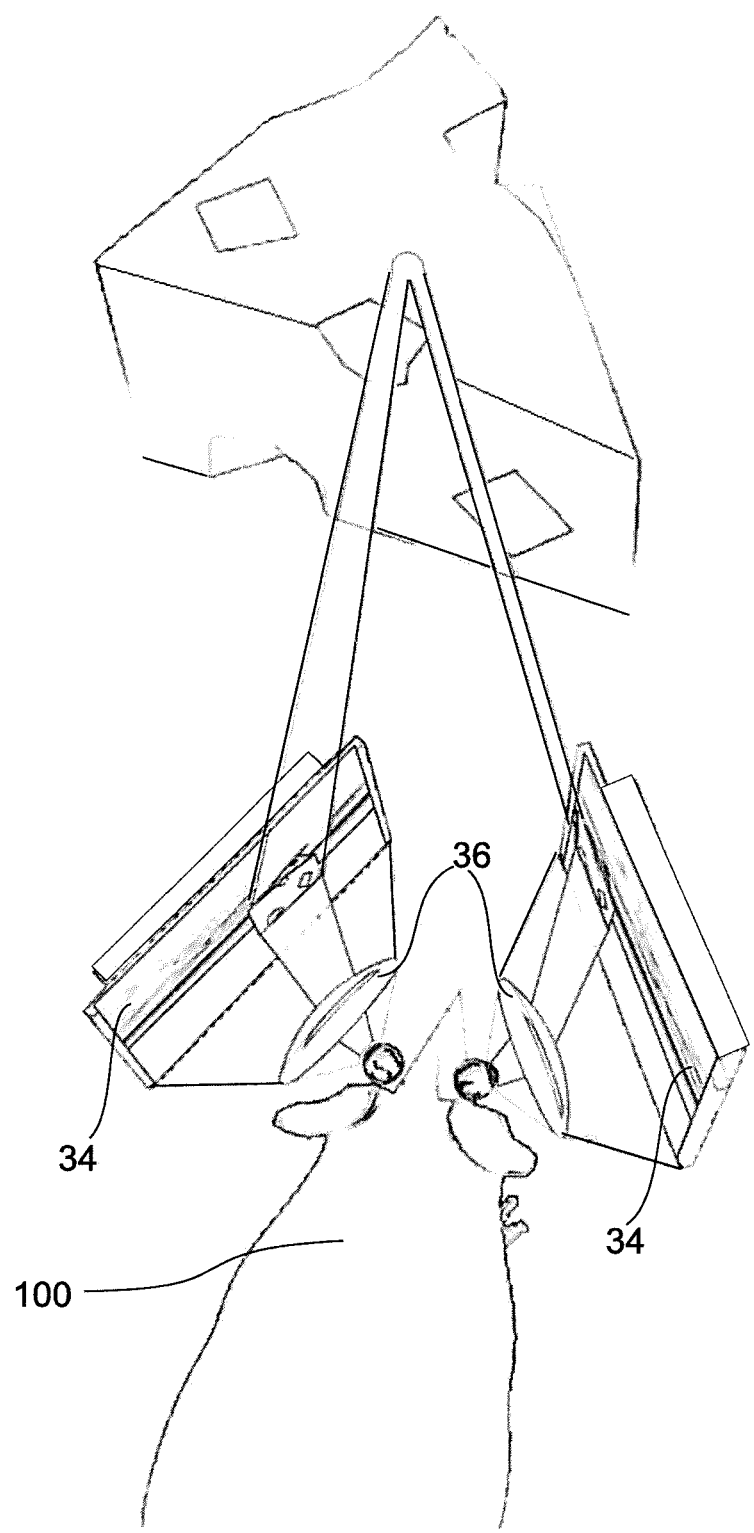

FIG. 2 is a perspective view of the simulator shown in FIG. 1*a* without wings, FIG. 3 is a schematic sectional view of an exemplary embodiment of a wing according to the invention, FIG. 4 is a schematic diagram illustrating the creation of virtual image content according to the invention.

FIG. 1 a shows a schematic front perspective view of an exemplary embodiment of the simulator 10 according to the invention, in the condition where the simulator 10 is applied to a small laboratory animal 100. The simulator 10 is used to create a virtual reality for a small laboratory animal 100. Virtual reality (VR) is a 3-dimensional artificial environment generated by a computing device in which elements of reality are completely excluded. The animal 100 can "tour" the virtual environment, interact with its elements. VR is thus the set of visual (or audio) information generated by a computer device that affects the senses (primarily sight, but also hearing) of the animal 100 as a result of the interaction between the animal 100 and the computer device. It is to be understood that in the context of the present invention, small laboratory animals 100 are primarily rodents (e.g., mice, rats, rabbits), but the term animals 100 includes other small animals commonly used in laboratory experiments (e.g., monkeys, lizards, etc.), as will be apparent to those skilled in the art.

The simulator 10 of the present invention includes a head clamping mechanism 20 for securing the head of a laboratory animal 100 and virtual reality glasses 40 with two wings 30. The head clamping mechanism 20 may preferably be made of metal or any material of suitable strength suitable for securing the head of the animal 100, thereby holding the animal 100 in place. The head clamping mechanism 20 may optionally be formed of a single piece or may consist of several parts, for example fastened to each other by screws, as can be seen in FIGS. 1a and 1b. In a particularly preferred embodiment, the head clamping mechanism 20 includes an observation opening 22 for a microscope objective 210 through which craniotomy brain imaging, known to those skilled in the art, can be performed in vivo on the animal 100. The head clamping mechanism 20 partially or, if appropriate, completely delimits the observation opening 22 (see FIGS. 1a, 1b and 2).

Each of the wings 30 having a display 34 and a lens system 36 spaced therefrom which connected together by a light barrier cover 32. The display 34 can be any type of display using known technology, such as LCD, OLED, etc., the resolution of which is suitable for creating a virtual reality experience. The resolution of the display 34 is preferably at least full HD, more preferably at least 2K, as is known to those skilled in the art. In an exemplary embodiment, the display 34 is a commercially available 2.9-inch diameter IPS LCD display with a resolution of 1440×1440 pixels. In a particularly preferred embodiment, the display 34 is designed as a bidirectional display 34 to monitor the pupil and eye movement of the experimental animal 100. In this case, the display 34 also functions as a CMOS camera sensor, so that in addition to displaying the image, digital images can also be taken with the display 34. Such a display 34 may be, for example, a 0.6-inch diameter, 2K resolution OLED display from Fraunhofer FEP.

In the context of the present description, the term lens system 36 is to be construed broadly to include an optical element comprising one or, where appropriate, multiple lens elements. The lens system 36 is sized to image an associated display 34 on the retina of the laboratory animal 100. Preferably, the lens system 36 is corrected for optical aberration (e.g., spherical, chromatic aberration) as will be apparent to those skilled in the art. Note that the lens system 36 may optionally be a single member aspherical lens or a Fresnel lens for size reduction.

FIG. 3 is a schematic sectional view of an exemplary embodiment of the wing 30 showing a possible configuration of the display 34 and lens system 36 connected by the light barrier cover 32 and the arrangement of the wing 30 relative to the eyes 101 of the animal 100. The cover 32 serves to secure the display 34 and the lens system 36 relative to each other and defines an interior space between the display 34 and the lens system 36 isolated from the outside world. The cover 32 is at least partially solid walled. In terms of material, it may be made of, for example, metal, plastic, etc., which provide adequate structural strength and light barrier, i.e., are suitable for securing the display 34 and lens system 36 relative to each other and do not allow outside light into the interior delimited by the cover 32. In a preferred embodiment, at least a portion of the light barrier cover 32 is made of a resilient material, preferably a light-blocking fabric. The function of this will be explained in detail later. The design of the wing 30 is such that the optical axis of the lens system 36 is preferably perpendicular to the plane of the display 34.

The virtual reality glasses 40 of the present invention are configured to allow the two wings 30 to align with one or the other eye 101 of the laboratory animal 100, respectively, and are preferably secured to the head clamping mechanism 20 by means of fasteners 50. When the simulator 10 is mounted, one eye 101 of the animal 100 can see only the image of one display 34, while the other eye 101 of the animal 100 can only see the image of the other display 34. In a particularly preferred embodiment, the fastening elements 50 are designed as a mechanism, such as a ball-and-socket mechanism, for allowing the individual wings 30 to rotate about any axis and to move along at least one, preferably vertically, axis. In this embodiment, the cover 32 of the wings 30 have holes 38 into which socket 52 of the ball joint of the fastening element 50 can be fastened. The ball joint socket 52 are fitted with ball heads 54 with shafts 56, which ball heads 54 are freely rotatable in the ball joint sockets 52. The end of the shaft 56 opposite the ball head 54 is releasably secured (e.g., by a screw) in a substantially vertical longitudinal bore 24 formed in the head clamping mechanism 20, as shown, for example, in FIGS. 1b and 2. In this way, the end of the shaft 56 can be fixed in the desired position along the longitudinal bore 24, so that the height of the wing 30 relative to the head clamping mechanism 20 can be adjusted. The advantage of the ball-and-socket mechanism is that the wings 30 can be aligned independently with the eyes 101 of the animal 100, i.e., the optical axes of the lens systems 36 can be fitted separately, exactly to the eye axes of the eyes 101, in parallel therewith. Note that other securing methods than those described above may be considered.

In embodiments where the head clamping mechanism 20 includes an opening 22, the wings 30 are secured to the head clamping mechanism 20 in a manner that leaves the observation opening 22 free, as shown, for example, in FIG. 1a. In a particularly preferred embodiment, the wings 30 are configured to allow the objective 210 of the microscope to be fitted to the observation opening 22 when the wings 30 are mounted on the head clamping mechanism 20. This can be ensured on the one hand by the appropriate sizing of the wings 30 and on the other hand by the appropriate choice of the material of the cover 32. For example, an embodiment is possible in which portions of the covers 32 proximal to the lens are made of a flexible, light-barrier textile or other flexible light-barrier material so that the lens 210 can be brought closer to the aperture 22 by deforming the fabric of the cover 32.

In the particularly preferred embodiment shown in FIG. 1*a*, the wings 30 are dimensioned in such a way as to leave the mustaches of the laboratory animal 100 free when the wings 30 are applied, i.e. the wings 30 do not touch the mustache of the animal 100. This can be provided by choosing the appropriate size of the display 34, depending on the species of animal 100. The advantage of this embodiment is that the simulator 10 does not interfere with the tactile sensation of the animal 100, thereby improving immersion and simulation efficiency.

In a particularly preferred embodiment, the simulator 10 comprises a tread 60, preferably in the form of a treadmill, a rotating disc, or a spherical treadmill arranged under the head clamping mechanism 20 which can be movable by the laboratory animal 100, as is known to those skilled in the art. The tread 60 is positioned below the head clamping mechanism 20 in such a way that the animal 100 secured by the head clamping mechanism 20 stands on the tread 60. The animal 100, secured by the head clamping mechanism 20, is able to mimic advancing motion by moving the tread 60, similar to people running on a treadmill. In a preferred embodiment, the tread 60 is provided with one or more displacement sensors 62 to determine the simulated speed or direction of travel of the animal 100.

The simulator 10 according to the invention preferably further comprises a control unit 70 having at least one processor and a storage device, in data communication with the displays 34 and the sensor 62. The term control unit 70 is to be construed broadly as used herein to include any hardware device capable of receiving, processing, storing, and electronically transmitting processed digital data. In a particularly preferred embodiment, the control unit 70 is configured as a personal computer (e.g., a desktop or laptop computer) having a storage for storing data received from the sensor 62 as well as computer programs and having a processor for processing the received data and running computer programs. The control unit 70 may optionally include one or more input devices (e.g., keyboard, mouse, etc.) in addition to the usual elements (e.g., direct access memory, network card, etc.) or may include an interface to serve as both an output and an input device (e.g. such as a CD/DVD burner/reader, etc.) as will be apparent to those skilled in the art. By means of a data transmission connection between the control unit 70 and the displays 34, which can take place, for example, via a MIPI interface or HDMI, the data processed by the control unit 70 can be transmitted to the display 34. Note that the data connection may be wired or, optionally, wireless (e.g., WiFi, Bluetooth, etc.), as is known to those skilled in the art.

The control unit 70 is configured to display the virtual image content on the displays 34 corresponding to the fields of view detected by the eyes 101 of the laboratory animal 100 by executing the at least one computer program. In other words, the control unit 70 sends different virtual image content to the displays 34 in such a way that the right eye 101 and the left eye 101 of the animal 100 see a right image and a different left image respectively, according to the rules of stereoscopic display, which the brain of the animal 100 perceives as a single 3-dimensional image. For example, in the embodiment shown in FIG. 4, the virtual object is a slice of cheese, the images of which are displayed on the displays 34 at different sizes, angles, and so on, as is known to those skilled in the art. Overlapping the fields of view perceived by the eyes 101 of the animal 100 develops binocular vision (spatial sensation) and monocular vision in the other parts. This approximately means (for example in case of mice) a 40-degree binocular and 270-degree peripheral field of view. As previously mentioned, when the simulator 10 is mounted, the optical axes of the lens systems 36 are preferably parallel to the eye axes of the eyes 101. If this is not possible (e.g. because the wings 30 need to be tilted better relative to the eye axes to free up space for the objective 210 used to examine the laboratory animal 100, or because the wings 30 cannot be tilted/rotated in arbitrary direction), then in a preferred embodiment displaying a 3-dimensional perspective-corrected virtual image content for the laboratory animal 100 with the 34 displays in a manner known per se. Note that the virtual image content generated by the control unit 70 during the running of the computer program may contain not only visual data but also, if appropriate, audio data (audio track), hence image data and content also means video data containing both visual and audio elements. In an exemplary embodiment, the simulator 10 includes a sound generating unit (not shown) for generating sound, controlled by the control unit 70, preferably a speaker for sounding the audio track of the virtual image content generated by the control unit 70. In another possible embodiment, the virtual image content also includes haptic data that has been transmitted to the animal 100 using devices designed for this purpose (e.g., vibrating motors), as is known to those skilled in the art.

In embodiments including the tread 60, the control unit 70 is preferably configured to generate and send virtual image content to the displays 34, taking into account the displacement measured by the one or more sensors 62. That is, for example, if the animal 100 simulates a straight travel on the tread 60, the virtual image content will change accordingly as if the animal 100 were traveling straight in the virtual space. For example, if the animal 100 moves the tread 60 as if it were turning to the left, the generated virtual image content will also change as if the animal 100 had turned to the left in the virtual space. In a possible embodiment, the simulator 10 includes a locking means (e.g., a brake) for preventing the movement of the tread 60, by means of which the tread 60 moved by the animal 100 can be stopped at the desired time so that the animal 100 cannot move it further. The locking means is preferably designed to be operated by the control unit 70. Thus, if the animal 100 reaches a virtual object (e.g. a wall) in the virtual environment during the simulation and wants to move forward, the tread 60 can be stopped immediately by the locking means, so that the animal 100 perceives, as in reality, that it cannot navigate through the virtual object. Should the animal 100 move in the direction of bypassing the virtual object, the tread 60 may be unblocked by releasing the locking means so that the animal 100 can continue roaming the virtual environment. The locking of the tread 60 may be supplemented by other effects (e.g., sound or haptic), making the simulation of the virtual environment even more realistic.

The invention further relates to a method for simulating virtual reality for small laboratory animals. In the following, the operation of the simulator 10 according to the invention will be described together with the method according to the invention.

In a particularly preferred embodiment, the method according to the invention is carried out by means of the simulator 10 according to the invention described above. During the method, the head of the laboratory animal 100 is fixed by means of the head clamping mechanism 20. The animal 100 may be secured in any known manner, such as by gluing. The head clamping mechanism 20 is provided with two virtual reality glasses 40 with wings 30, each of which is provided with a display 34 and a lens system 36 spaced therefrom, which connected together by a light barrier cover 32. In a preferred embodiment, the glasses 40 are secured to the head clamping mechanism 20 by the ball-and-socket mechanism shown above, by means of which the two wings 30 are adjusted to one or the other eye 101 of the laboratory animal 100, respectively. When adjusting the wings 30, care must be taken to ensure that the optical axes of the lens systems 36 are as close as possible to the eye axes of the eyes 101 of the animal 100 and that the lens systems 36 are spaced from the eyes 101 of the animal 100 to project images of the displays 34 onto the retinas of the animal 100. In order to create the best possible virtual experience, the wings 30 are preferably designed to shield the space between the eyes 101 and the lens systems 36 as well. Thus, the 100 animals do not visually perceive anything from the outside world. Once the wings 30 have been adjusted, the displays 34 display virtual image content corresponding to the fields of view of the laboratory animal 100, i.e. slightly different from the perspectives of the two eyes 101, on the displays 34, which the animal's 100 brain perceives as a single 3-dimensional image. The virtual image contents displayed on the displays 34, i.e. the computer program running on the control unit 70, are selected depending on the type of experiment to be performed. For example, if you want to perform a learning experiment with 100 animals, the virtual reality created by the virtual visual content can be, for example, a virtual maze, and so on. In a particularly preferred embodiment, a tread 60, preferably a treadmill, a rotating disc, or a spherical treadmill, is provided under the head clamping mechanism 20 on which the laboratory animal 100 may perform running movements. The displacement of the tread 60 is sensed by the one or more sensors 62, and the displays 34 display virtual image content corresponding to the sensed displacement. In other words, the virtual environment is generated according to the signals of the sensor 62, so that the animal 100 feels that it is inside the virtual environment and can traverse it.

In a particularly preferred embodiment, an observation opening 22 is provided on the head clamping mechanism 20 for a microscope objective 210, and while simulating virtual reality, the brain activity of the experimental animal 100 is measured through the observation opening 22 using the microscope (e.g., a two-photon microscope). In this embodiment, a craniotomy window is formed on the skull of the animal 100 prior to securing the animal 100, as will be apparent to those skilled in the art. Brain processes can be examined through the opening 22 with the help of the microscope, so that several behavioral parameters of the 100 animals interacting with the virtual environment can be measured. The type of experiment can be modified by changing the virtual environment.

Since the virtual image content displayed on the displays 34 covers substantially the entire field of view of the animal 100, in order to more accurately determine the animal's 100 interaction with the virtual environment, it is desirable to determine which part of the virtual environment the animal 100 is looking at. Therefore, in a preferred embodiment, a bidirectional display 34 adapted to monitor the eye movement, and preferably the pupil movement of the laboratory animal 100 is provided. From the measured eye movement and preferably pupil movement data, visual directions are determined by means of which on each display 34 the currently displayed image part or the virtual object belonging to the image part on which the animal 100 focuses at a given moment can be identified. For example, in a given experiment, it can be determined whether the animal 100 noticed a virtual object (e.g., food, predator, etc.) in the virtual environment that is important to the experiment. In this way, the interaction of the animal 100 with the virtual environment can be studied even more effectively.

With the aid of the simulator 10 and the method according to the invention, it is possible to perform immediate effect experiments and significantly faster learning can be achieved compared to previous methods. While using the prior art solutions, the visual learning process typically took 1-2 weeks, the simulator 10 and method of the present invention can reduce the time required to a time scale of up to a few days (e.g., 3-4 days). In the context of the present invention, learning a task means that the animal 100 is able to solve the task with a predetermined rate of success, e.g., can stably distinguish two types of samples with at least 80% success. In our experiments, we found that with the help of the simulator 10 and method according to the invention, a significant success rate of 10-20% can be achieved even after 20-40 minutes of use. That is, with the help of the simulator 10 and the method, at least a superficial understanding of the task can be ensured very quickly. A further advantage is that, compared to other VR solutions, there are no disturbing visual reference points outside the virtual environment in the animal's field of view that would ruin the virtual reality experience. Thus, the immersion is formed in the animal 100 practically immediately after the glasses 40 are placed, in contrast to the prior art, where either there is no virtual reality experience at all, or it requires conditioning of the animal 100 for weeks. The glasses 40 of the present invention provide binocular vision to the animal 100, thereby providing perspective and depth for which prior art systems are not suitable. A further advantage of the simulator 10 is that it can be easily and flexibly adapted to the desired position of the animal 100 under the microscope, as well as to the current location of the operation on the skull and the size of the animal 100. The simulator 10 is applicable to small laboratory animals 100 (e.g., mice, rats, marmosets) and is designed to be compatible with multiphoton microscopy and electrophysiological measurement procedures.

The invention claimed is:

1. Virtual reality simulator for a small laboratory animal which comprises
   a head clamping mechanism for securing the head of said laboratory animal;
   an observation opening in the head clamping mechanism configured to fit a microscope; and
   a pair of independent wing structures carried by the head clamping mechanism, adjustably mounted to the head clamping mechanism and spaced from one another; each said wing structure including a lens system a display, and a light barrier cover connected thereto, and being independently adjustable for alignment with each eye of said small laboratory animal to present together a stereoscopic virtual reality image to said small laboratory animal.

2. The simulator according to claim 1, characterized in that said wing structures are fixed to the head clamping mechanism by means of fastening elements.

3. The simulator according to claim 1, characterized in that it includes a control unit in communication with the displays, at least one processor and a storage device, wherein at least one computer program is stored on the storage device, and the control unit is configured to provide said stereoscopic virtual reality image by executing at least one computer program.

4. The simulator according to claim 2, characterized in that the fastening elements enable rotation of said wing structures about any axis and for displacement of at least one axis.

5. The simulator according to claim 1, characterized in that the lens system comprises one or more lens elements and the lens system is dimensioned to present to a retina of the laboratory animal an image from said display.

6. The simulator according to claim 1, characterized in that the display is bidirectional for monitoring the pupil and eye movement of the laboratory animal.

7. The simulator according to claim 1, characterized in that the wing structures allow a microscope objective to be fitted to the observation opening when the wing structures are connected to the head clamping mechanism.

8. The simulator according to claim 1, characterized in that a part of the light barrier cover is made of a flexible material.

9. The simulator according to claim 1, characterized in that the wing structures are dimensioned to leave whiskers of the laboratory animal free when the wing structures are aligned.

10. The simulator according to claim 1, characterized in that a tread movable by the laboratory animal is provided below the head clamping mechanism.

11. The simulator according to claim 10, characterized in that the tread is provided with a displacement sensor.

12. A method of simulating stereoscopic virtual reality for a small laboratory animal, comprising the steps of securing the head of the laboratory animal to the virtual reality simulator of claim 1, aligning said lens systems with the eyes of the laboratory animal, and presenting a stereoscopic virtual reality image to the laboratory animal.

13. The method according to claim 12, characterized in that brain activity of the laboratory animal is measured by means of a microscope through the observation opening while the stereoscopic virtual reality image is displayed.

14. The method according to claim 12, characterized in that a tread is provided below the head clamping mechanism, on which the laboratory animal can perform a running movement, movement of the tread is detected by a sensor and a virtual reality image corresponding to the detected movement is shown on the displays.

15. The method according to claim 12, characterized in that a bidirectional display adapted to monitor the eye movement is provided, pupil movement of the laboratory animal is determined, during simulation of virtual reality, and parts of the virtual reality image are shown on the displays based on directions of vision by the laboratory animal.

16. The simulator according to claim 2 wherein the fastening elements allow rotation of said individual wing structures about any axis and for displacement of vertical axis.

17. The simulator according to claim 8 wherein the flexible material is a light blocking fabric.

18. The simulator according to claim 10 wherein the tread is a treadmill.

* * * * *